Patented June 15, 1948

2,443,292

UNITED STATES PATENT OFFICE 2,443,292

AMMONOLYSIS OF MONOCHLORALKYL NITRILES

Oscar W. Bauer and John W. Teter, Chicago, Ill., assignors to Sinclair Refining Company, New York, N. Y., a corporation of Maine No Drawing. Application August 10, 1945, Serial No. 610,187

2 Claims. (Cl. 260—464)

This invention relates to improvements in the production of aminonitriles, which are useful for the production of amino acids, amino esters, diamines, and other products.

The aminonitriles which may be readily prepared in accordance with the present invention are the monoaminonitriles which may be represented by the general formula

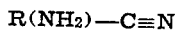

$$R(NH_2)-C \equiv N$$

in which R is an alkyl group having from 1 to 11 carbon atoms and substituted by the amino group which may be in the omega position or may be linked to a secondary carbon atom in the alkyl group. The invention is of particular importance as applied to the production of the aminonitriles having a total of 2 to 5 carbon atoms, including glycinonitrile, 2 and 3-monoaminopropionitriles, 2, 3 and 4-monoaminobutyronitriles, and the various isomeric aminovaleronitriles.

In accordance with the present invention, these aminonitriles are prepared by the reaction of liquid anhydrous ammonia with the corresponding monochloronitrile. Room temperatures are conveniently used for most of the products, although with monochloracetonitrile better yields appear to be obtained by the use of low temperatures, for example around 0° C., and longer reaction times, to minimize polymerization or other side reactions which tend to reduce the yield. Ammonium chloride is a by-product of the reaction and ammonia should therefore be used in excess sufficient to provide that required for the primary reaction and that required to neutralize the hydrogen chloride formed, and in general it is advantageous to use quite a large excess of ammonia, for example, 10 moles per mole of nitrile. The operation is carried out under pressure to keep the ammonia liquid.

The invention will be illustrated by the following examples but it is not limited thereto.

*Example 1.*—3-chloropropionitrile and ammonia, in molar proportions of 1:10 were placed in a pressure vessel and maintained for 18 hours at a pressure of 125–150 lbs. per square inch and at room temperature (around 70–75° F.). At the end of the reaction period, the excess ammonia was released, the contents in the tube extracted with absolute alcohol in several portions, the insoluble salt (ammonium chloride) removed by filtration and the filtrate concentrated in vacuum to about ½ volume, removing the last traces of ammonia. A solution of hydrogen chloride in absolute alcohol was then added to the filtrate until it was acid to Congo red. Crystals of the hydrochloride of 3-aminopropionitrile dropped out of solution and were purified by recrystallization from absolute alcohol. The product was obtained in over 90% yield.

By a similar procedure 3-aminobutyronitrile was obtained in over 90% yield and 4-aminobutyronitrile with a yield of over 80%. Using the same reaction temperature, 2-aminopropionitrile and 2-aminobutyronitrile were obtained in yields between 20 and 30% but by increasing the reaction time to 42 hours and using somewhat higher temperature around 80 to 90° F. yields between 74 and 90% were obtained. The 2-aminopropionitrile is quite unstable and has a tendency to condense, giving off ammonia and forming 2,2'-iminodipropionitrile, and with this product it is advantageous to use ether in isolating it and acetone in recrystallizing its hydrochloride.

*Example 2.*—Monochloracetonitrile and ammonia in molar ratios of .13:1 were reacted in a pressure vessel packed in ice for 2 days. The vessel was then cooled with dry ice and acetone, opened and the ammonia boiled off. After the bulk of the ammonia had evaporated, a vacuum was applied to remove the remaining ammonia while the temperature of the mass was kept below 0° C. The residue in the vessel was extracted 3 times with absolute alcohol and the extract was concentrated under vacuum to remove any ammonia still present and was then neutralized with hydrogen chloride in absolute alcohol. Glycinonitrile hydrochloride crystallized as a grey product and was obtained in a yield between 85 and 90%.

We claim:

1. In a process for producing compounds of the formula

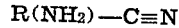

$$R(NH_2)-C \equiv N$$

in which R is an alkyl group having from 1 to 11 carbon atoms and in which the amino group is in the omega position or is linked to a secondary carbon atom in the alkyl group, the improvement which comprises reacting the corresponding monochloroalkylnitrile with liquid anhydrous ammonia in the absence of an organic solvent at a temperature not substantially exceeding room temperature.

2. In a process for producing compounds of the formula

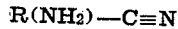

$$R(NH_2)-C \equiv N$$

in which R is an alkyl group having from 1 to 4 carbon atoms and in which the amino group is in the omega position or is linked to a secondary carbon atom in the alkyl group, the improvement which comprises reacting the corresponding monochloroalkylnitrile with liquid anhydrous ammonia in the absence of an organic solvent at a temperature not substantially exceeding room temperature.

OSCAR W. BAUER.
JOHN W. TETER.

REFERENCES CITED

The following references are of record in the file of this patent:

UNITED STATES PATENTS

| Number | Name | Date |
|---|---|---|
| 1,992,615 | Hoffman et al. | Feb. 26, 1935 |
| 2,109,929 | Rigby | Mar. 1, 1938 |
| 2,163,594 | Engels | June 27, 1939 |
| 2,195,974 | Reppe et al. | Apr. 2, 1940 |
| 2,298,739 | Lichty et al. | Oct. 13, 1942 |

FOREIGN PATENTS

| Number | Country | Date |
|---|---|---|
| 511,841 | Great Britain | Aug. 25, 1939 |

OTHER REFERENCES

Keil: Chem. Abst., vol. 22, page 385 (1928).
Whitmore et al.: "Jour. Am. Chem. Soc.," vol. 66, pages 725–731 (1944).